United States Patent
Nylander et al.

(10) Patent No.: US 6,450,579 B1
(45) Date of Patent: Sep. 17, 2002

(54) FOLDABLE SEAT FOR A VEHICLE

(75) Inventors: Andreas Nylander; Fredrik Eklof, both of Gothenburg (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/622,411

(22) PCT Filed: Feb. 16, 1999

(86) PCT No.: PCT/SE99/00200

§ 371 (c)(1),
(2), (4) Date: Oct. 31, 2000

(87) PCT Pub. No.: WO99/41103

PCT Pub. Date: Aug. 19, 1999

(30) Foreign Application Priority Data

Feb. 16, 1998 (SE) ................................................ 9800435

(51) Int. Cl.⁷ ................................................ A47C 7/00
(52) U.S. Cl. .............................. 297/378.1; 297/378.12; 297/452.4
(58) Field of Search ............................ 297/378.1, 378.2, 297/452.4, 353, 284.1

(56) References Cited

U.S. PATENT DOCUMENTS

| | | | |
|---|---|---|---|
| 567,491 A | * | 9/1896 | Murphy ................... 297/452.4 |
| 3,311,405 A | | 3/1967 | Brennan et al. |
| 4,957,321 A | | 9/1990 | Martin et al. |
| 5,195,795 A | | 3/1993 | Cannera et al. |
| 5,295,732 A | * | 3/1994 | Boisset ................... 297/188.04 |
| 5,322,344 A | * | 6/1994 | Hoffman et al. ....... 297/188.04 |
| 5,547,259 A | * | 8/1996 | Fredrick ................... 297/452.4 |
| 5,564,786 A | * | 10/1996 | Peek et al. ............... 297/452.4 |

FOREIGN PATENT DOCUMENTS

| | | |
|---|---|---|
| DE | 2 107 435 | 9/1971 |
| EP | 0 364 146 | 4/1990 |
| GB | 2 110 619 | 6/1983 |
| GB | 2 205 490 | 12/1988 |
| GB | 2 268 877 | 1/1994 |

* cited by examiner

*Primary Examiner*—Peter R. Brown
(74) *Attorney, Agent, or Firm*—Young & Thompson

(57) ABSTRACT

A vehicle seat includes first and second elements for providing support for a person sitting in the vehicle seat. A link mechanism is arranged so as to interconnect the first and second elements in an articulated manner, so that the second element can be folded towards and away from the first element. The first and second elements, when in a folded-together state, extend in an essentially common plane, and the second element accommodates the first element.

11 Claims, 6 Drawing Sheets

FOLDABLE SEAT FOR A VEHICLE

BACKGROUND OF THE INVENTION

The present invention relates to a vehicle seat comprising a first and second element for providing support for a person sitting in the vehicle seat, and a link mechanism arranged so as to interconnect the first and the second element in an articulated manner, so that the second element can be folded towards and away from the first element.

In order to increase the storage space for baggage in a vehicle, it is desirable that one or more seats in the vehicle are collapsible to that the space where the seat is situated is converted into baggage space. Such collapsible vehicle seats are found, for example, in passenger cars of the estate type and mini-buses. In these vehicles, all or part of the rear seat can be collapsed so that a surface located on the rear side of the backrest forms a part of the floor or storage surface of the baggage space. The backrest is then folded forwards and over the seat part. Alternatively, the seat part is first folded forwards and then the backrest is folded forwards.

When the backrest is folded forwards, it is desirable that the rear side of the backrest comes to lie at the same level as the floor of the usual storage space in order to avoid differences in the level of the floor, which make loading and unloading of baggage more difficult. By virtue of the fact that the rear side of the backrest comes to lie at the same level as the floor of the usual storage space, the greatest possible volume of the baggage space is also obtained, which is desirable.

However, the collapsible vehicle seats which exist today require a great deal of space in the collapsed state. In a case where the seat part is folded forwards first, after which the backrest is folded forwards, the seat part comes to be located above the floor level in the baggage space. Furthermore, this collapsed vehicle seat requires a great deal of space in the longitudinal direction of the vehicle. In a case where the backrest is folded over the seat part, a great deal of space is required below the floor level in the baggage space, which results in the clearance of the vehicle above the roadway being reduced or the floor level of the baggage space having to be raised.

SUMMARY OF THE INVENTION

It is an object of the present invention to produce a collapsible vehicle seat which in the collapsed state requires a smaller space than known collapsible vehicle seats.

This is achieved by means of a vehicle seat of the type referred to in the introduction, in which the first and the second element, when in. a folded-together state, extend in an essentially common plane, and the second element accommodates the first element.

Such a vehicle seat is very compact in the collapsed state and requires a small space below the floor level in the baggage space, which simplifies the installation of the seat in the vehicle because the geometry of the vehicle is not appreciably affected by the seat when it is collapsed.

BRIEF DESCRIPTION OF THE DRAWINGS

The invention will be described in greater detail below with the aid of exemplary embodiments shown in the appended figures, in which.

DETAILED DESCRIPTION OF THE PREFERRED EMBODIMENTS

With reference to FIGS. 1–4, the principle of how the vehicle seat 1 according to the present invention is collapsed will be explained. The vehicle seat 1 comprises a seat part 2 and a backrest 3 for providing support for a person sitting in the vehicle seat 1. The seat part 2 and the backrest 3 are provided with tensionable support surfaces 4, 5 made of suitable material such as cloth, hide or plastic. The tensionable support surface 4, 5 is connected to first and second side-pieces 6, 7 of the seat part and to an upper cross-strut 8 of the backrest 3 and a rear cross-strut (not shown in FIGS. 1–4) of the seat part 4. The upper cross-strut 8 of the backrest 3 extends between first and second side-pieces 9, 10 of the backrest 3. The rear cross-strut of the seat part 2 is formed as a part of a frame (not shown in FIGS. 1–4) in the seat part 2.

According to the basic embodiment according to FIGS. 1–4, the vehicle seat 1 is provided with a neck support 11 which can be displaced relative to the backrest 3 in a conventional manner. The seat part 2 and the backrest 3 are connected in an articulated manner by means of a link mechanism, so that the backrest 3 can be folded towards and away from the seat part 2. The link mechanism is not shown in FIGS. 1–4.

In order to collapse the vehicle seat 1, a lock (not shown in FIGS. 1–4) is released, so that the backrest 3 can be folded in the direction towards the seat part 2. The arrow P1 in FIG. 1 indicates the direction of folding of the backrest 3. At the same time as the backrest 3 is folded forwards towards the seat part 2, the first and second side-pieces 6, 7 of the seat part 2 are displaced towards one another, which means that the support surface 4 arranged on the seat part 2 then assumes an untensioned state. The displacement of the side-pieces 6, 7 of the seat part 2 is brought about automatically when the backrest 3 is folded forwards towards the seat part 2, this being brought about by means of a member, such as a lever mechanism and a transmission (not shown in FIGS. 1–4), which will be described in greater detail below.

When the backrest 3 is folded. forwards about the link mechanism, the backrest 3 is displaced backwards relative to the seat part 2 on account of the design of the link mechanism. This movement of the backrest 3 also results in the support surface 5 arranged on the backrest 3 assuming an untensioned state.

Figures 1, 2:
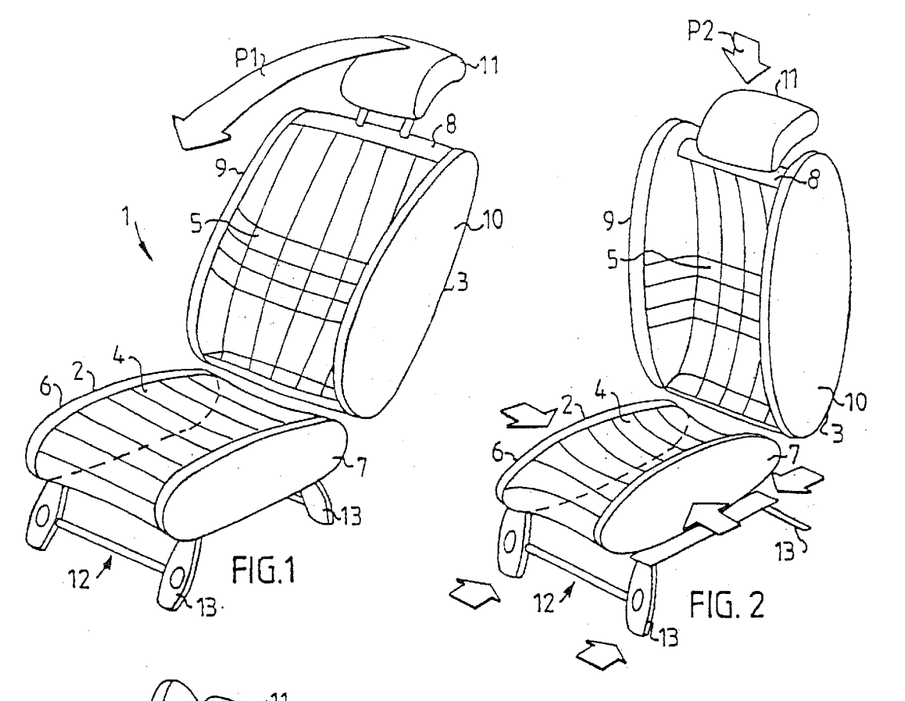
FIGS. 1–4 show the principle of how the vehicle seat according to the invention is collapsed.

As shown in FIG. 2, the neck support 11 is displaced according to the arrow P2 in the direction towards the backrest 3 when the backrest 3 is folded forwards towards the seat part 2. This displacement of the neck support 11 can take place automatically by means of a transmission (not shown).

Figure 3:
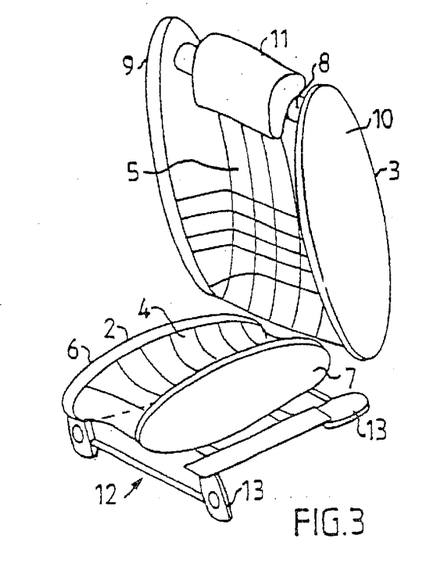

A collapsible underframe 12 is arranged below the seat part 2. When the vehicle seat 1 is collapsed, the underframe 12 is also collapsed. The underframe 12 is suitably displaced forwards while legs 13 arranged on the underframe 12 are folded backwards. This collapsing of the underframe 12 results in it being possible for the whole vehicle seat 1 in the collapsed state to be accommodated in a hollow which is usually arranged in the vehicle in front of the vehicle seat 1 when the latter is raised and in which hollow the feet of the person sitting in the vehicle seat 1 are placed.

Figure 4:
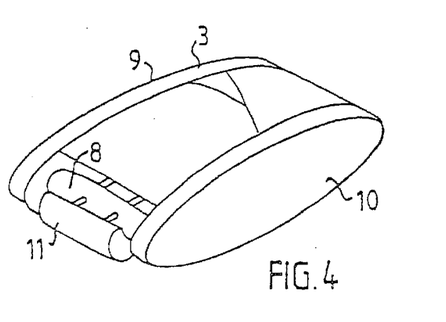

FIG. 4 shows the vehicle seat 1 in the collapsed state. As the first and second side-pieces 6, 7 of the seat part 2 have been displaced in the direction towards one another, the width of the seat part 2 is now smaller than the width of the backrest 3. This means that the seat part 2 can be accommodated in the backrest 3 when the vehicle seat 1 is collapsed. As shown in FIG. 4, the seat part 2 and the backrest 3, when in the folded-together state, that is to say in the collapsed state, extend in an essentially common plane. The side-pieces 9, 10 of the backrest 3 can each have a thickness in the width direction of the backrest 3. If this is the case, the width of the seat part 2 will be reduced to a width which is smaller than the distance between the inner sides of the side-pieces 9, 10. The inner sides of the side-pieces 9, 10 are in this context those sides of the side-pieces 9, 10 of the backrest 3 which face towards one another.

FIGS. 5–10 show a first preferred embodiment of the vehicle seat 1 according to the present invention. The seat part 2 and the backrest 3 are, as mentioned above, interconnected in an articulated manner by a link mechanism 14 which, according to the first embodiment shown, comprises a front and rear link arm 15, 16. The front link arm 15 is longer than the rear link arm 16 and is connected by its one end 17 to the seat part 2 and by its other end. 18 to the backrest 3. The front link arm 15 is located closer to the front edge of the seat part 2 than the rear link arm 16. The rear link arm 16 is connected by its one end 20 to the seat part 2 and by its other end 21 to the backrest 3. The front and rear link arms 15, 16 are arranged on both sides of the vehicle seat 3. The front link arm 15 is provided with a heel 22 which, in the raised state of the vehicle seat 1, is arranged so as to bear against one end 21 of the rear link arm 16. The positive locking which then arises between the front and rear link arms 15, 16 fixes the angle a of the backrest 3 relative to the seat part 2. This angle α can, by means of a suitable adjusting arrangement (not shown), be changed in order to be adapted to different requirements.

FIGS. 5–10 show the tensionable support surface 4, 5 of the seat part and the backrest in fragmentary form. In order to provide good sitting comfort, the support surface 4, 5 preferably has an area which corresponds to the entire area of the seat part 2 and the backrest 3. In the raised state of the vehicle seat 1 shown in FIGS. 5 and 6, the support surface 5 of the backrest 3 is tensioned between an upper cross-strut 8 of the backrest 3 and a rear cross-strut (FIG. 8) of the seat part 2. The support surface 4 of the seat part 2 is tensioned between the displaceable side-pieces 6, 7. In order to make it possible to collapse the vehicle seat 1, at least the support surface 5 arranged on the backrest 3 must assume an untensioned state, which is brought about by the link mechanism 14 during folding of the backrest 3 towards the seat part 2, as described above. In order to obtain the very compact vehicle seat 1 in the collapsed state, the side-pieces 6, 7 of the seat part 2 are displaced towards one another when the backrest 3 is folded towards the seat part 2. In the collapsed state, the seat part 2 then has a width which corresponds to the distance between the dot-dash lines L in FIG. 6.

Figure 7:
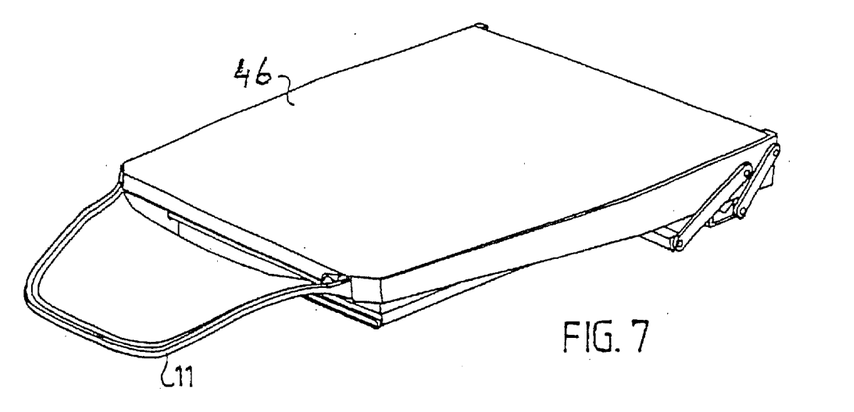
FIG. 7 shows a perspective view of the vehicle seat according to the first embodiment in the collapsed state.

The vehicle seat 1 is shown in the collapsed state in FIG. 7. The backrest 3 is provided on the rear side with a plate 46 which, in the collapsed state of the vehicle seat 1, forms a storage surface in the vehicle (not shown) where the vehicle seat 1 is situated. In the collapsed state, the seat part 2 is accommodated in the backrest 3, so that the seat part 2 and the backrest 3 extend in an essentially common plane.

Figure 8:
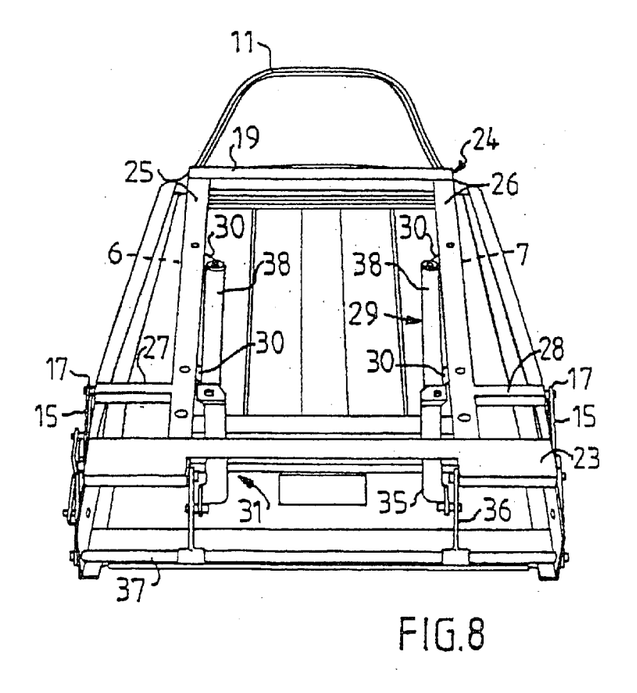
FIG. 8 shows a view at an angle from below of the vehicle seat according to the first embodiment in the collapsed state.

FIG. 8 shows the vehicle seat 1 at an angle from below, in the collapsed state. The side elements 6, 7 are brought together to the smallest possible width which corresponds to the width of a frame 24 arranged in the seat part 2. The frame 24 comprises two side beams 25, 26 and a front and rear cross-strut 19, 23. The side beams 25, 26 have struts 27, 28 which extend essentially at right angles from the respective side beam 25, 26. One end 17 of each front link arm 15 is rotatably connected to the respective strut 27, 28.

The member for varying the width of the seat part 2 is described below with reference to FIGS. 8–10. A lever mechanism 29, which comprises two levers 30 rotatably connected to the respective side beam 25, 26, is connected by one end 34 to a transmission 31 and guided by the other end 33 in a groove 32 in the side element 6, 7 of the seat part 2. When the respective lever 30 is rotated about the fastening point 39 in the side beam 25, 26, one end of the levers 30 slides in the grooves 32 in the side elements 6, 7, which results in the side elements 6, 7 being displaced in the direction away from or towards the respective side beam 25, 26 depending on the direction in which the levers 30 are rotated about the fastening point 39.

The transmission 31 transmits movement from the backrest 3 to each lever 30 when the backrest 3 is rotated about the link mechanism 14. According to the first embodiment, the transmission 31 comprises a link strut 35 which is rotatably coupled to a connecting link 36 between a lower cross-strut 37 of the backrest 3 and the rear cross-strut 23 of the frame 24 of the seat part 2. The link strut 35 is preferably coupled to a point on the connecting link 36 located essentially midway between the ends of the connecting link 36. The levers 30 on each side beam 25, 26 are coupled together in pairs by a parallel strut 38 which is also coupled to the link strut 35. According to the first embodiment, the transmission 31 comprises two link struts 35 and two connecting links 36. The connecting links 36 are rotatably connected to the lower cross-strut 37 of the backrest 3 and the rear cross-strut 23 of the frame. When the backrest 3 is folded in the direction towards the seat part 2, the centre of the connecting links 36 is moved backwards, that is to say away from the seat part 2, The connecting link 36 then pulls the link strut 35 backwards with it, so that the levers 30 are rotated about their fastening points 39 on the side beams 25, 26. This rotational movement of the levers 30 results in the side-pieces 6, 7 of the seat part 2 being displaced in the direction towards one another so that the width of the seat part 2 is reduced.

Figure 9:
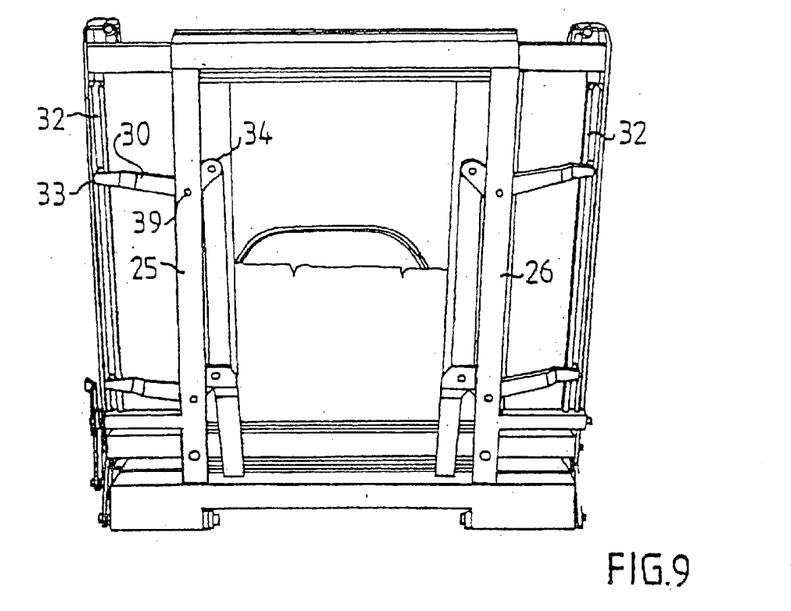
FIG. 9 shows a view from below of the vehicle seat according to the first embodiment in the raised state.
Figure 10:
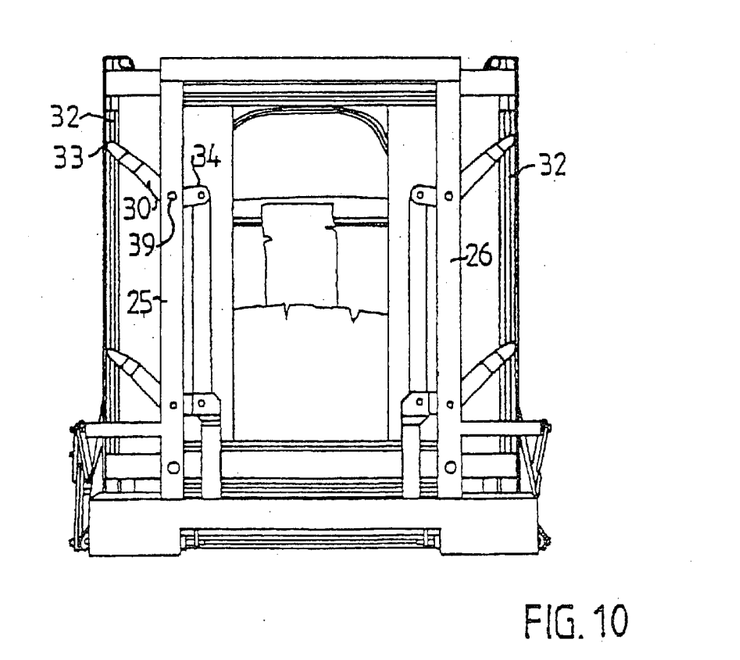
FIG. 10 shows a view from below of the vehicle seat according to the first embodiment in an intermediate state.

FIG. 9 shows the vehicle seat 1 from below when the vehicle seat 1 is raised. In this state, the levers 30 have displaced the side-pieces 6, 7 in the direction away from one another, so that the seat part 2 has its full width. FIG. 10 shows the seat part 2 and the levers 30 in an intermediate state, that is to say the vehicle seat 1 is being raised or collapsed.

Figure 11:
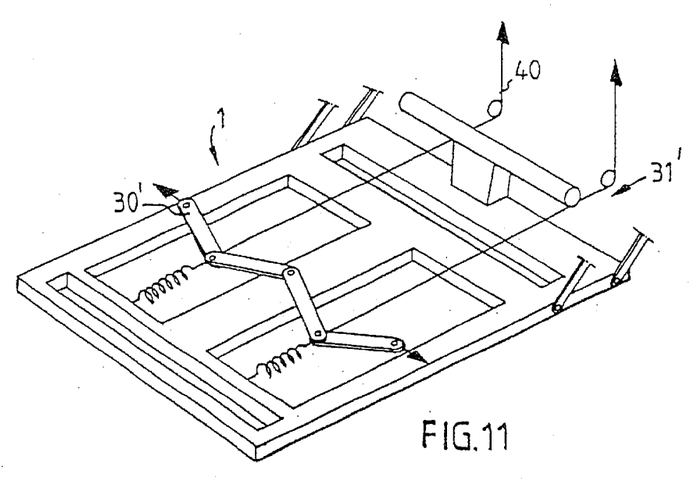
FIG. 11 shows a perspective view of a transmission for a vehicle seat according to a second embodiment.

FIG. 11 shows a transmission 31' for the vehicle seat 1 according to a second embodiment. Two cords 40 extend from the backrest (not shown in FIG. 11) to spring-loaded levers 30'. When the backrest is folded towards or away from the seat part 2, the levers 30' displace the side-pieces (not shown in FIG. 11), as described in connection with the first embodiment.

Figures 12, 13:
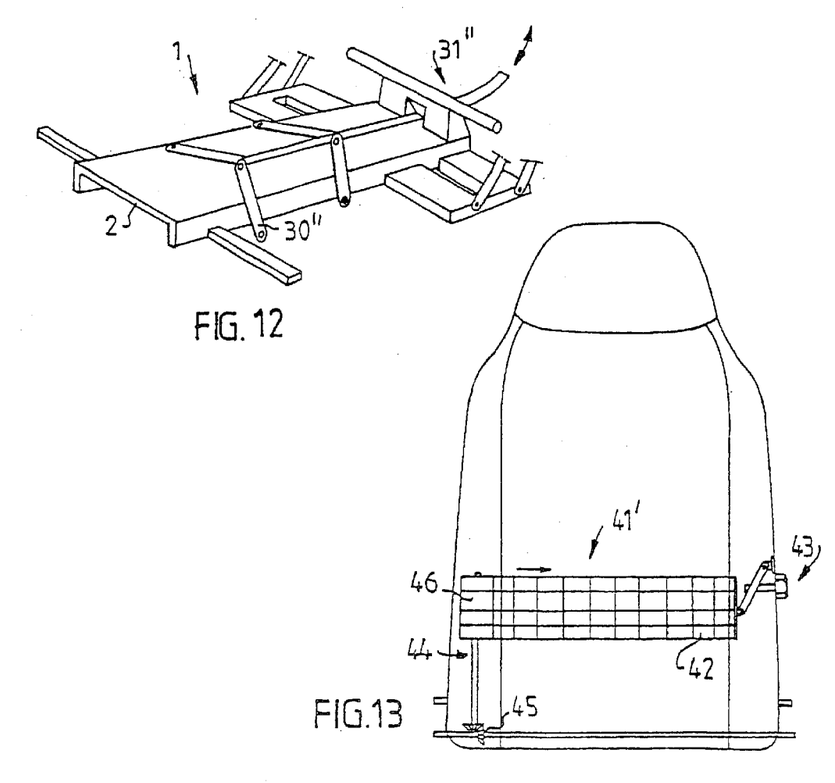
FIG. 12 shows a perspective view of a transmission for a vehicle seat according to a third embodiment.
FIG. 13 shows a front view of a backrest with a hollow-back support according to a second embodiment.

FIG. 12 shows a transmission 31" for the vehicle seat 1 according to a third embodiment. Instead of having two parallel link struts 35, the fission 31" according to the third embodiment is provided with only one link strut 35" which extends essentially centrally in the seat part 2. When the backrest (not shown in FIG. 12) is folded towards or away from the seat part 2, the link strut 35" acts on the levers 30" so that the side pieces (not shown in FIG. 12) are displaced towards or, respectively, away from one another.

Figures 5, 6:
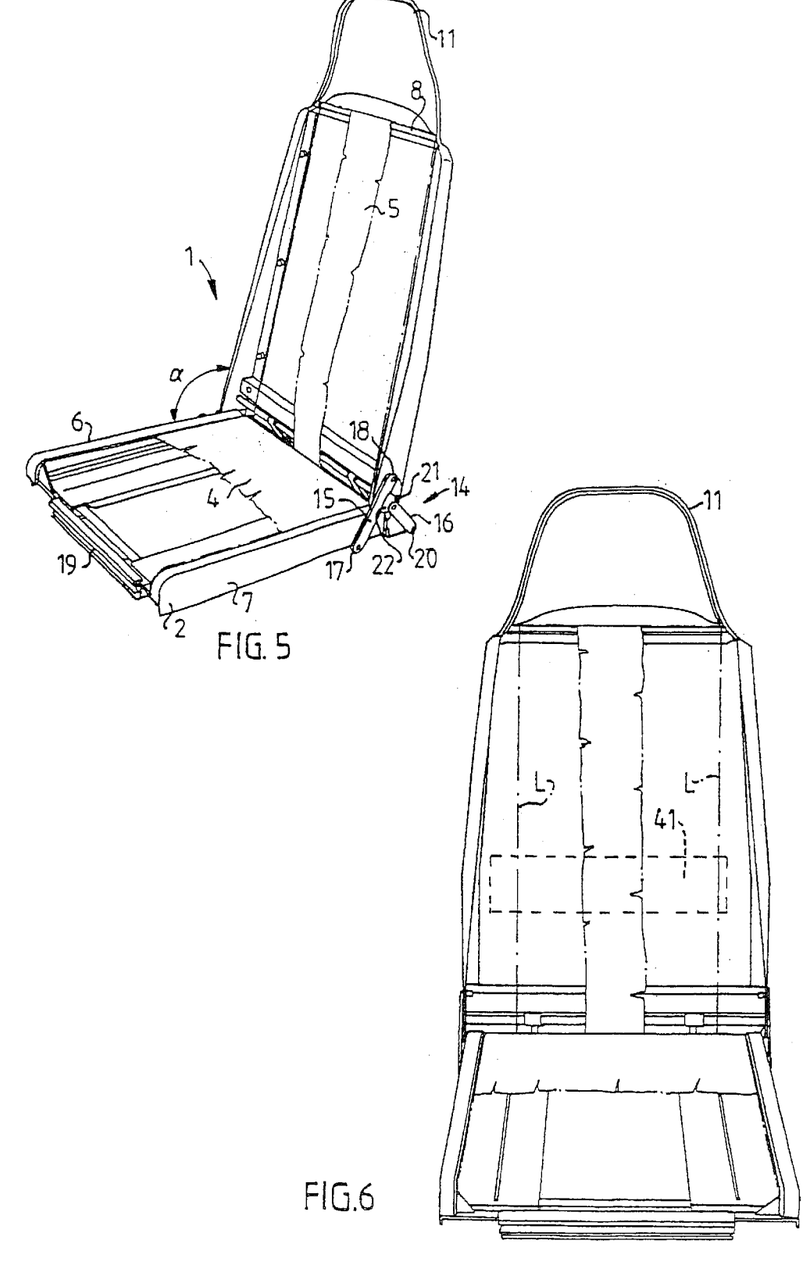
FIG. 5 shows a perspective view of a first embodiment of a vehicle seat according to the invention in the raised state.
FIG. 6 shows a front view of the vehicle seat according to the first embodiment in the raised state.

In order to increase the sitting comfort, the backrest 3 can be provided with a hollow-back support 41 (shown diagrammatically in FIG. 6). The hollow-back support 41 must, however, be adapted so that the vehicle seat 1 can be collapsed into the very compact state shown in FIGS. 4 and 7. For example, the hollow-back support 4 may consist of a foam rubber body which is arranged in the lower region of the backrest 3. When the vehicle seat 1 is collapsed, the foam-rubber body is compressed when it bears against the seat part 2.

A second embodiment of a hollow-back support 41' is shown in FIG. 13. This hollow-back support 41' comprises a band 42 which is preferably flexible and extends between the two side edges 9, 10 of the backrest 3. An adjusting arrangement 43 is arranged at the second side edge 10 of the backrest 3 in order to make it possible to adjust the hardness or tension of the hollow-back support 41' in the raised state of the vehicle seat 1. A tensioning arrangement 44 for the hollow-back support 41' is arranged at the other side edge 9 of the backrest 3. The arrangement 44 comprises a gearing 45 which, when the backrest 3 is raised and collapsed, transmits a rotational movement to a roller 46 around which the flexible band 42 can be rolled up or unrolled so as to tension or, respectively, relax the hollow-back support 41'.

The neck support 11, which is shown in connection with the first embodiment, can be provided with a suitable arrangement for letting it into the backrest 3.

Figures 14, 15:
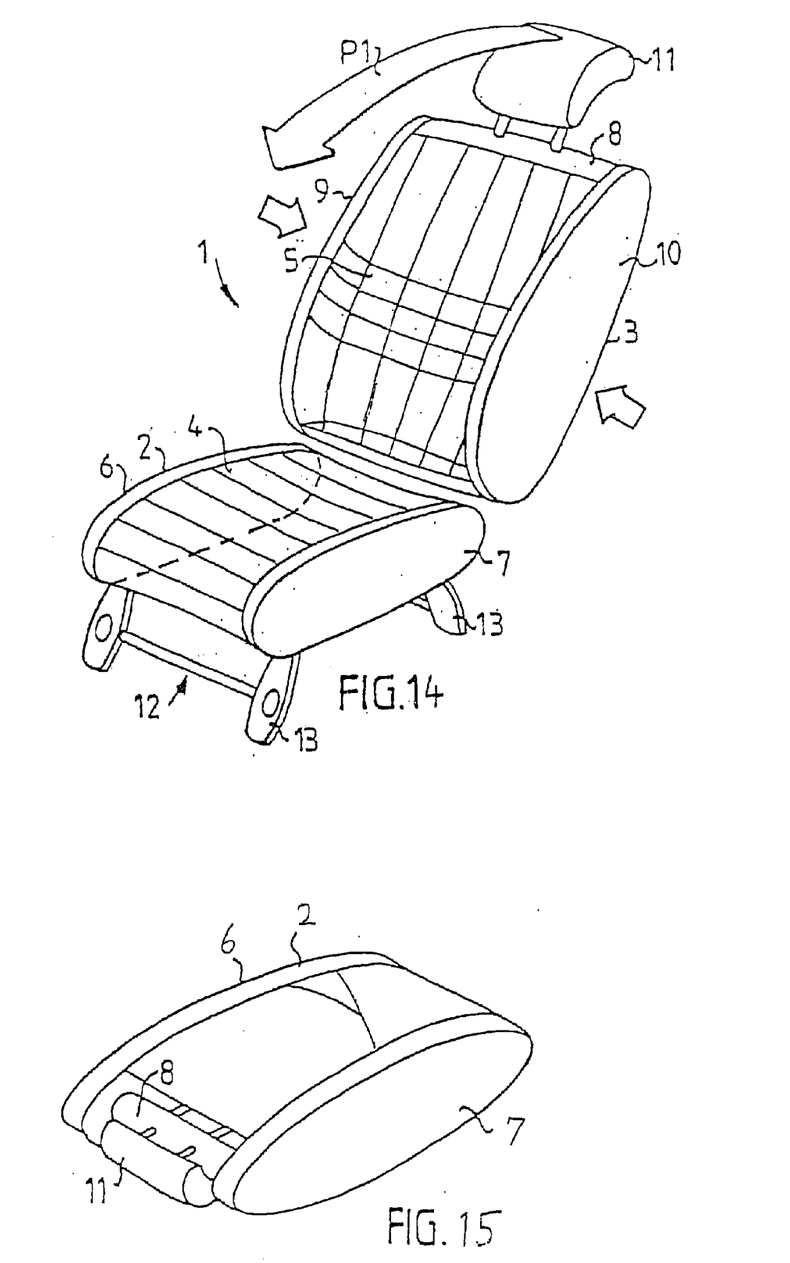
FIGS. 14 and 15 show the principle of how the vehicle seat according to another embodiment is collapsed.

As an alternative to reducing the width of the seat part 2, the width of the backrest 3 can be reduced, as shown in FIG. 14, instead, using a suitable arrangement, so that the backrest is accommodated in the seat part 2 in the collapsed state of the vehicle seat 1, as shown in FIG. 15.

The figures show a vehicle seat 1 which is intended for one sitting person. The vehicle seat 1 may, however, have a width which allows a number of people to sit next to one another in the seat 1, like a rear seat in a vehicle.

What is claimed is:

1. Vehicle seat comprising:
   first and second elements for providing support for a person sitting in the vehicle seat;
   a link mechanism arranged between the first and second elements to interconnect the first and second elements in an articulated manner, so that the second element can be folded towards and away from the first element, the first and second elements being essentially the same width when in a state in which they are folded away from one another; and
   a member connected to the first element and to a transmission, the transmission being arranged and adapted to transmit movement from the second element to the member when the second element is folded towards or away from the first element, wherein
   the member being arranged and adapted to vary the width of the first element and to reduce the width of the first element when the second element is folded towards the first element, the first and second elements, when in a folded-together state, extending in an essentially common plane,
   the second element accommodating the first element.

2. Vehicle seat according to claim 1, wherein the member comprises at least one lever, connected to a displaceable side-piece of the first element, arranged on a side of the first element, the lever being arranged so as to displace the side-piece.

3. Vehicle seat according to claim 1, further comprising a tensionable support surface arranged on the first element, wherein the tensionable support surface is connected between first and second side-pieces of the first element, arranged on opposite sides of the first element.

4. Vehicle seat according to claim 1, further comprising a tensionable support surface arranged on the second element, wherein the tensionable support surface is connected between first and second side-pieces of the second element, arranged on opposite sides of the second element.

5. Vehicle seat comprising:
   first and second elements for providing support for a person sitting in the vehicle seat;
   a link mechanism arranged so as to interconnect the first and second elements in an articulated manner, so that the second element can be folded towards and away from the first element, the first and second elements being essentially the same width when in a state in which they are folded away from one another;
   a member connected to the first element and to a transmission, the transmission being arranged and adapted to transmit movement from the second element to the member when the second element is folded towards or away from the first element, wherein
   the member being arranged and adapted to vary the width of the first element and to reduce the width of the first element when the second element is folded towards the first element, the first and second elements, when in a folded-together state, extending in an essentially common plane,
   the second element accommodating the first element; and
   a tensionable support surface arranged on the first element and connected to first and second side-pieces of the first element, arranged on opposite sides of the first element, wherein
   the support surface is arranged so as to be tensioned when the first and second elements are in a state in which they are folded away from one another and to be untensioned when the first and second elements are in the folded-together state.

6. Vehicle seat comprising:
   first and second elements for providing support for a person sitting in the vehicle seat;
   a link mechanism arranged so as to interconnect the first and second elements in an articulated manner, so that the second element can be folded towards and away from the first element, the first and second elements being essentially the same width when in a state in which they are folded away from one another;
   a member connected to the first element and to a transmission, the transmission being arranged and adapted to transmit movement from the second element to the member when the second element is folded towards or away from the first element, wherein the member being arranged and adapted to vary the width of the first element and to reduce the width of the first element when the second element is folded towards the first element, the first and second elements, when in a folded-together state, extending in an essentially common plane, the second element accommodating the first element, the first element being a seat part, and the second element being a backrest.

7. Vehicle seat according to claim 6, further comprising a collapsible underframe arranged below the seat part, connected to the seat part and to the vehicle.

8. Vehicle seat according to claim 6, further comprising a tensionable hollow-back support arranged in a lower region of the backrest and adapted to be tensioned and relaxed when the backrest is raised and collapsed, respectively.

9. Vehicle seat according to claim 6, wherein a surface of the backrest facing away from the seat part forms a storage surface when the backrest is in a folded-together state with the seat part.

10. Vehicle seat comprising:

first and second elements for providing support for a person sitting in the vehicle seat;

a link mechanism arranged so as to interconnect the first and second elements in an articulated manner, so that the second element can be folded towards and away from the first element, the first and second elements being essentially the same width when in a state in which they are folded away from one another;

a member connected to the first element and to a transmission, the transmission being arranged and adapted to transmit movement from the second element to the member when the second element is folded towards or away from the first element, wherein the member being arranged and adapted to vary the width of the first element and to reduce the width of the first element when the second element is folded towards the first element, the first and second elements, when in a folded-together state, extending in an essentially common plane, the second element accommodating the first element, the first element being a backrest, and the second element being a seat part.

11. Vehicle seat comprising:

first and second elements for providing support for a person sitting in the vehicle seat;

a link mechanism arranged so as to interconnect the first and second elements in an articulated manner, so that the second element can be folded towards and away from the first element, the first and second elements being essentially the same width when in a state in which they are folded away from one another;

a member being connected to the first element and to a transmission, the transmission being adapted to transmit movement from the second element to the member when the second element is folded towards or away from the first element, wherein the member is arranged so as to vary the width of the first element, the member is adapted to reduce the width of the first element when the second element is folded towards the first element, the first and second elements, when in a folded-together state, extending in an essentially common plane, the second element accommodates the first element; and a tensionable support surface arranged on the second element and connected to first and second sidepieces of the second element, arranged on opposite sides of the second element, wherein the support surface is arranged so as to be tensioned when the first and second elements are in a state in which they are folded away from one another and to be untensioned when the first and second elements are in the folded-together state.

* * * * *